United States Patent [19]

Young

[11] 4,299,032
[45] Nov. 10, 1981

[54] SPECTACLES LENS-FRAME FITTING COORDINATOR

[75] Inventor: John M. Young, Sturbridge, Mass.

[73] Assignee: American Optical Corporation, Southbridge, Mass.

[21] Appl. No.: 142,588

[22] Filed: Apr. 21, 1980

[51] Int. Cl.³ .............................................. G01B 5/00
[52] U.S. Cl. .................................... 33/174 A; 33/200
[58] Field of Search ............................. 33/174 A, 200

[56] References Cited

U.S. PATENT DOCUMENTS

| | | | |
|---|---|---|---|
| 1,438,519 | 12/1922 | Covelle | 33/174 A |
| 1,790,572 | 1/1931 | Bugbee | 33/174 A |
| 2,755,553 | 7/1956 | Vaughan | 33/174 A X |
| 3,740,857 | 6/1973 | Nerad | 33/174 A |

*Primary Examiner*—Harry N. Haroian
*Attorney, Agent, or Firm*—Alan H. Spencer

[57] ABSTRACT

A device for use in determining the minimum size of ophthalmic lens blank which may be made to fit a desired spectacles frame or the largest frame for a given lens blank size.

10 Claims, 4 Drawing Figures

U.S. Patent  Nov. 10, 1981  Sheet 1 of 2  4,299,032
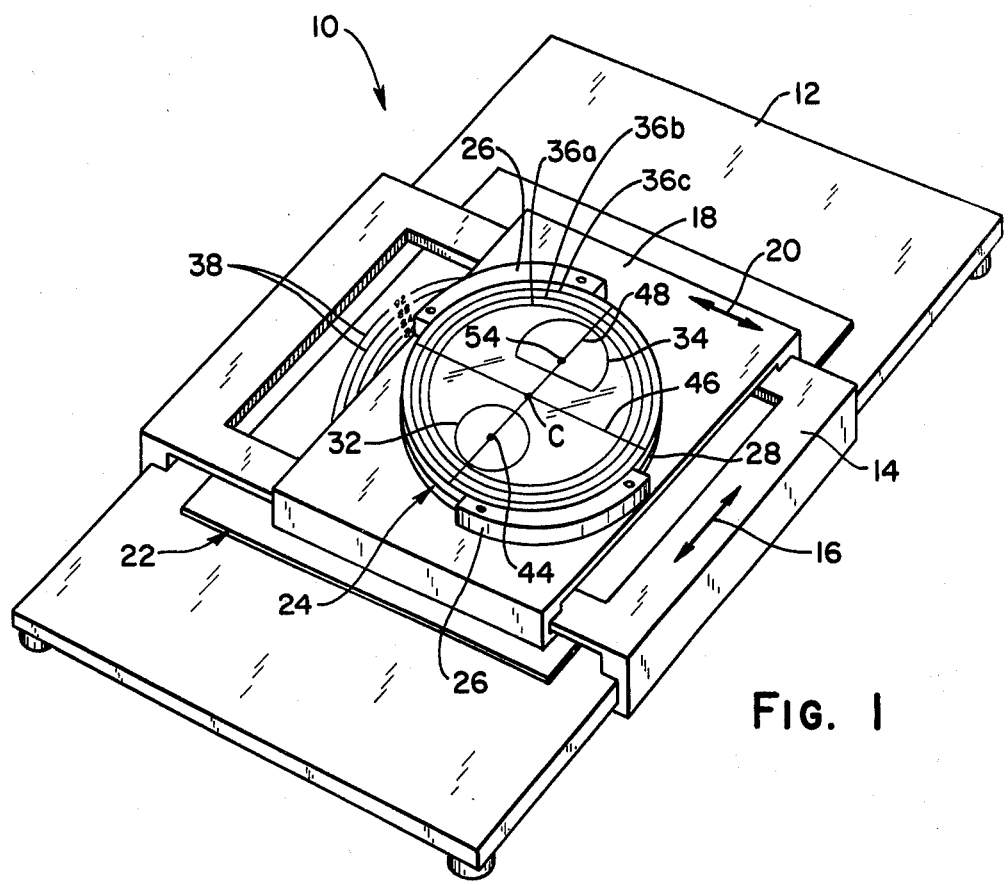
FIG. 1
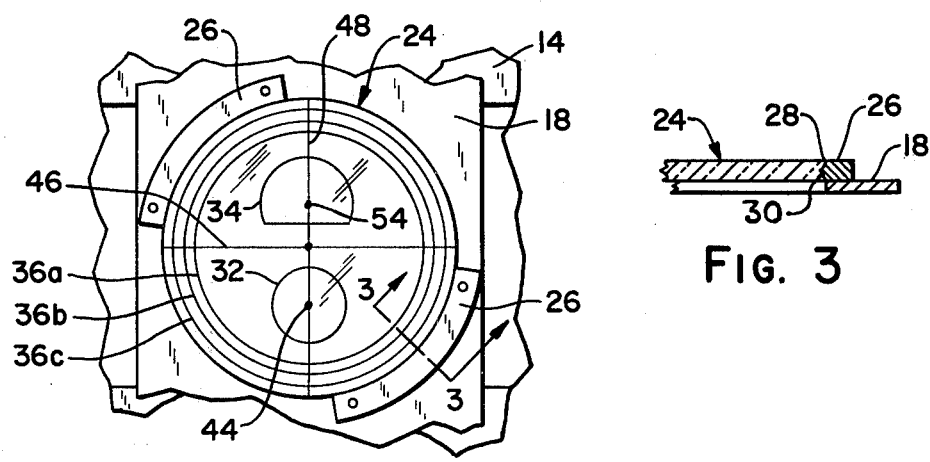
FIG. 2
FIG. 3

SPECTACLES LENS-FRAME FITTING COORDINATOR

BACKGROUND OF THE INVENTION

1. Field of the Invention

Fitting ophthalmic lenses to spectacles frames with particular reference to means for facilitating determination of minimum lens blank size for given spectacles frame size and/or maximum frame size for given lens blank size.

2. Discussion of the Prior Art

In the preparation of an ophthalmic lens for spectacles glazing, there is the need to select an uncut blank of a size from which the intended spectacles effective diameter (ED) can be obtained with proper lens optical center and/or segment location.

The selection of lens blank size to fit particular spectacles frames and vice versa ordinarily requires complicated calculation, the use of a computer or reliance upon ED charts which require removal of blanks and frames from stock and checking for ED suitability by careful positioning one at a time over the chart. Unsatisfactory blanks and/or spectacles frames are required to be returned to inventory or otherwise set aside. An exemplary ED chart is illustrated in U.S. Pat. No. 3,740,857 wherein the tediousness and drawbacks of method taught are readily apparent.

In view of the above, this invention has the objective of quickly straightforwardly and accurately determining suitable uncut lens blank sizes for edge finishing to particular spectacles frame ED measurements or suitable spectacles ED measurement for particularly selected lens blank sizes, this being accomplished prior to and for facilitating the selection of stock.

Another object is to accomplish the foregoing with minimal cost and complication of equipment, optimum ease of operation and accuracy of findings.

Other objects and advantages of the invention will become apparent from the following description.

SUMMARY OF THE INVENTION

The above and corollary objectives of the invention are accomplished with a spectacles lens-frame fitting coordinator having an ED finder chart over which a mock lens is slideably adjustably along vertical and horizontal meridians of the chart. The mock lens, having a simulated optical center and reading segment outline may be adjusted relative to markings on the chart according to the actual segment height and inset requirements of a patient's prescription.

Reading the chart through the adjusted mock lens affords indication of optimum spectacles frame size (ED) and/or minimum uncut lens blank size required for prescription edging.

Details of the invention will become more readily apparent from the following description when taken in conjunction with the accompanying drawings.

IN THE DRAWINGS

FIG. 1 is an illustration, in perspective, of a preferred embodiment of the invention;

FIG. 2 is a fragmentary plan view of a portion of the spectacles lens-frame fitting coordinator of FIG. 1;

FIG. 3 is a fragmentary cross-sectional view taken approximately along line 3—3 of FIG. 2.

DESCRIPTION OF THE PREFERRED EMBODIMENTS

Figure 4:
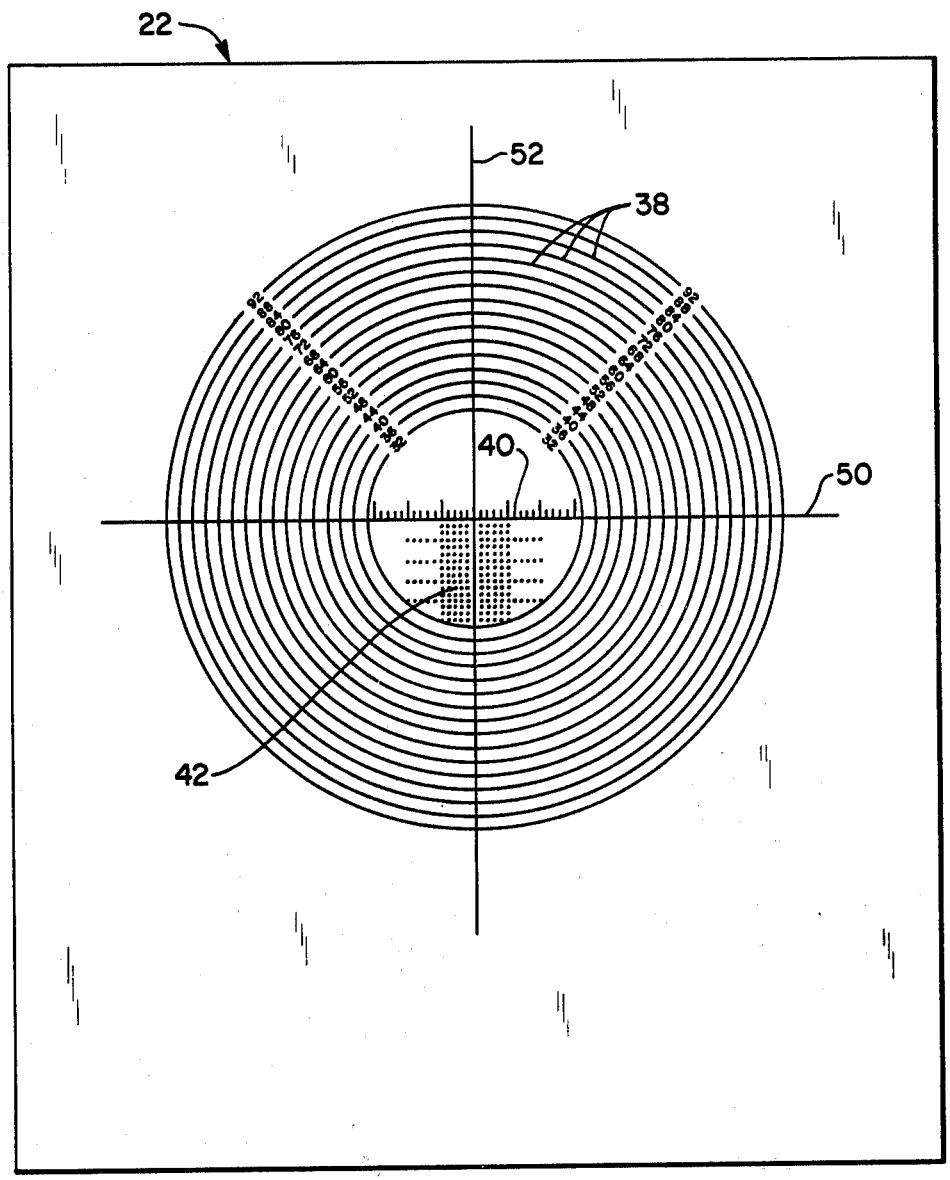
FIG. 4 is a plan view of an ED chart component of the device of FIG. 1.

The spectacles lens-frame fitting coordinator 10 of FIG. 1 includes base 12, first slide 14 which is adjustable along base 12 in the directions of double headed arrow 16 and second slide 18 which is adjustable along first slide 14 in the directions of double headed arrow 20. Beneath slide 16 on base 12 is ED (effective diameter) finder chart 22 (FIGS. 1 and 4).

Mock lens 24 is carried by slide 18 for adjustment over chart 22 and is rotatable about its center C in keepers 26 which are screwed, bolted, riveted, cemented or otherwise fixed to slide 18.

Edge 28 of lens 24 is channeled for receiving beveled edges 30 of keepers 26. Other configurations of channeling and interfitting keeper edges may, of course, be used for similarly holding lens 24 in place while permitting its rotation about center C. Lens rotation may be effected by grasping lens 24 with thumb and forefinger between keepers 26.

Simulated multifocal segments 32 and 34 are provided upon mock lens 24. These are in the form of outlines representing different conventional reading portion shapes each located at a distance away from center C which corresponds to the traditional segment height location of, for example, 2 mm below center for the circular segment 32 and 3.5 mm for the "flat-top" segment 34. Segments 32 and 34 are aligned with center C of lens 24 for alternate service by 180° rotation of lens 24 from a position of one segment use to the other. It should be understood that the segment outlines 32 and 34 may be provided at one side only of the lens center if desired, i.e. one may be placed over the other each in a different color for ease of identification. Also, segment shapes other than those illustrated may be provided at the same or different sides of center C, i.e. a different segment or multiple segment (trifocal) outline may be placed in each quadrant of lens 24 and rotated to a position of service.

In addition to segment outlines 32 and 34, lens size outlines 36a, 36b and 36c are provided for determination of actual lens blank size needed for a particular lens or frame ED as will be explained shortly. The outlines 36a, 36b and 36c may, for example, represent lens blank diametral sizes of 60, 63 and 66 millimeters respectively.

It should also be understood that, in order to meet particular requirements, a mock lens or lenses representing blank sizes and segment sizes and shapes other than those mentioned above may be substituted for lens 24 by simply loosening or removing and replacing one of keepers 26, i.e. it is contemplated that fitting coordinator 10 may be rendered adaptable to lens 24 interchangeability when universality to large numbers of segment shapes, styles and overall lens sizes is required.

Chart 22 per se is of the conventional ED (effective diameter) finder design wherein circles 38 are diametrally dimentioned in millimeters. A millimeter scale 40 is provided horizontally across the centermost circle and dots 42 thereunder are located 1 mm apart both horizontally and vertically for use in measurement of lens segment decentration.

Operation of the fitting coordinator 10 is as follows:

EXAMPLE A

Determining Minimum Uncut Multifocal Lens Blank Size Needed to Obtain a Given ED for Spectacles Glazing (a) Select the simulated segment shape on mock lens 24 which corresponds to that desired of a finished lens to be glazed.

(b) Bring the simulated segment into a position of use over the area of dots 42 on chart 22 by rotating lens 24 as needed, e.g. the circular segment 32 (FIGS. 1 and 2) is in such a position.

(c) Using the simulated optical center 44 of segment outline 32, decenter left or right by the amount prescribed for a patient to be fitted. This may be accomplished by rotating lens 24 in keepers 26 clockwise or counterclockwise until center 44 coincides with a millimeter dot 42 representing a selected millimeter distance to one side of vertical line 52.

(d) Observe chart 22 through mock lens 24 and visually select a circle 38 diameter equaling the ED required for spectacles glazing, i.e. the selected spectacles frame ED. This having been done, visually select the smallest blank size outline 36a, 36b, 36c within which the previously selected ED circle remains unbroken. This will provide indication of smallest lens blank size suitable for finishing and glazing.

Note: If "Flat-top" segment 34 is selected for the above procedure, decentering of its simulated optical center 54 may be accomplished by coordinated adjustment of both of slides 14 and 18 using dots 42 and/or scale 40 as needed.

EXAMPLE B

Determining Largest Spectacles Frame ED for a Given Lens Blank Size (a) Repeat (a), (b) and (c) of Example A.

(b) Visually select a lens blank size outline 36a, 36b, 36c corresponding to the given lens blank size and read chart 22 through mock lens 24 to locate the largest circle 38 not crossed by the selected lens size outline 36. This diameter (i.e. of the largest unbroken circle 38) represents the largest spectacles frame ED that can be fitted with the given lens blank size.

It should be apparent that fitting coordinator 10 may also be used for determining a minimum single vision uncut lens size required to obtain a given edged lens ED as follows:

EXAMPLE C (a) Place the center C of mock lens 24 over the intersection of horizontal and vertical lines 50 and 52 respectively on chart 22. This simulates location of the geometrical center of a lens blank to be used.

(b) Visually select the smallest outline 36a, 36b, 36c within which the given ED diameter circle 38 remains unbroken, (i.e. not crossed). This smallest circular outline represents the smallest usable lens blank diameter.

As it is well known in the art of spectacles glazing, ED (effective diameter) is the longest dimension from one side to another across a lens or across an area encompassed by a spectacles lens rim regardless of the edge contour of the lens or shape of the inner edge of the spectacles lens rim. Also, the term "uncut" in reference to lens size refers to the size of lens blank before edging to final spectacles lens shape.

It should be apparent from the above that various modifications and adaptations of the presently illustrated form of the invention may be made to suit particular requirements and that these illustrations are not to be interpreted as restrictive of the invention beyond that necessitated by the following claims.

I claim:

1. A spectacles lens-frame fitting coordinator comprising:
   a base;
   an ED finder chart on said base having right-angularly intersecting horizontal and vertical lines, and a multiplicity of concentric circles centered on said intersection of said horizontal and vertical lines, said circles comprising ED markings;
   a pair of superimposed slides on said base, one being adjustable in a direction parallel to one of said lines on the chart and the other adjustable right-angularly in a direction parallel to the other of said lines, said chart being observable through said slides; and
   a mock lens carried by the uppermost one of said slides, said mock lens having uncut lens blank size markings and being adjustable over said chart by adjustment of said slides for reference of said lens blank size markings with said ED markings on said chart and determination therefrom of proper spectacles lens-frame fitting dimensions.

2. A spectacles lens-frame fitting coordinator according to claim 1 wherein said mock lens has a geometrical center and is rotatable about said geometrical center on said one slide.

3. A spectacles lens-frame fitting coordinator according to claim 2 wherein said mock lens is rotatable in keepers affixed to said one slide.

4. A spectacles lens-frame fitting coordinator according to claim 2 wherein said mock lens further has an outline depicting the shape of a multifocal lens segment.

5. A spectacles lens-frame fitting coordinator according to claim 2 wherein said mock lens also has a plurality of outlines each depicting a different multifocal lens segment shape.

6. A spectacles lens-frame fitting coordinator according to claim 4 wherein said mock lens has a mark within said segment outline, said mark indicating the normal location of optical center of a lens segment having the depicted shape.

7. A spectacles lens-frame fitting coordinator according to claim 5 wherein said mock lens has a mark within each segment outline, said marks indicating the normal locations of optical centers of lens segment shapes corresponding to those of said segment outlines.

8. A spectacles lens-frame fitting coordinator according to claim 2 wherein said uncut lens blank size markings on said mock lens comprise a plurality of concentric circles centered with said geometrical center of said mock lens.

9. A spectacles lens-frame fitting coordinator according to claim 5 wherein said plurality of segment shape outlines include a pair thereof, one opposite the other along a diameter of said mock lens.

10. A spectacles lens-frame fitting coordinator according to claim 5 wherein said plurality of segment shape outlines include one in each of four quadrants of said mock lens.

* * * * *